US009658782B2

(12) United States Patent
Romem et al.

(10) Patent No.: US 9,658,782 B2
(45) Date of Patent: May 23, 2017

(54) SCALABLE DATA USING RDMA AND MMIO (71) Applicant: EXCELERO, Jerusalem (IL)

(72) Inventors: Yaniv Romem, Jerusalem (IL); Omri Mann, Jerusalem (IL); Ofer Oshri, Kafar Saba (IL)

(73) Assignee: Excelero Storage Ltd., Tel Aviv (IL)

( * ) Notice: Subject to any disclaimer, the term of this patent is extended or adjusted under 35 U.S.C. 154(b) by 209 days.

(21) Appl. No.: 14/698,121

(22) Filed: Apr. 28, 2015

(65) Prior Publication Data
US 2016/0034418 A1 Feb. 4, 2016

Related U.S. Application Data (60) Provisional application No. 62/126,920, filed on Mar. 2, 2015, provisional application No. 62/119,412, filed (Continued)

(51) Int. Cl.
  *G06F 15/167* (2006.01)
  *G06F 3/06* (2006.01)
  (Continued)

(52) U.S. Cl.
  CPC .......... *G06F 3/0611* (2013.01); *G06F 3/0604* (2013.01); *G06F 3/064* (2013.01); *G06F 3/065* (2013.01); *G06F 3/067* (2013.01); *G06F 3/0637* (2013.01); *G06F 3/0647* (2013.01); *G06F 3/0652* (2013.01); *G06F 3/0659* (2013.01); *G06F 3/0688* (2013.01); *G06F 3/0689* (2013.01); *G06F 12/1081* (2013.01); *G06F 15/167* (2013.01); *G06F 15/17331* (2013.01); *H04L 12/06* (2013.01); (Continued)

(58) Field of Classification Search
  USPC ....... 709/203, 212, 213, 214, 215, 216, 217, 709/219, 223, 226, 228, 232; 710/59
  See application file for complete search history.

(56) References Cited

U.S. PATENT DOCUMENTS

5,717,691 A  2/1998 Dighe et al.
7,515,612 B1  4/2009 Thompson
(Continued)

*Primary Examiner* — Quang N Nguyen
(74) *Attorney, Agent, or Firm* — M&B IP Analysts, LLC (57) ABSTRACT

To improve upon some of the characteristics of current storage systems in general and block data storage systems in particular, exemplary embodiments combine state-of-the art networking techniques with state-of-the-art data storage elements in a novel way. To accomplish this combination in a highly effective way, it is proposed to combine networking remote direct memory access (RDMA) technique and storage-oriented memory mapped input output (MMIO) technique in a system to provide direct access from a remote storage client to a remote storage system with little to no central processing unit (CPU) intervention of the remote storage server. In some embodiments, this technique may reduce the required CPU intervention on the client side. These reductions of CPU intervention potentially reduce latency while providing performance improvements, and/or providing more data transfer bandwidth and/or throughput and/or more operations per second compared to other systems with equivalent hardware.

25 Claims, 3 Drawing Sheets

Related U.S. Application Data on Feb. 23, 2015, provisional application No. 62/096,908, filed on Dec. 26, 2014, provisional application No. 62/085,568, filed on Nov. 30, 2014, provisional application No. 62/030,700, filed on Jul. 30, 2014.

(51) Int. Cl.
*H04L 29/08* (2006.01)
*G06F 15/173* (2006.01)
*G06F 12/1081* (2016.01)
*H04L 12/06* (2006.01)
*H04L 12/64* (2006.01)

(52) U.S. Cl.
CPC ...... *H04L 12/6418* (2013.01); *H04L 67/1097* (2013.01); *G06F 2212/65* (2013.01)

(56) References Cited

U.S. PATENT DOCUMENTS

| | | |
|---|---|---|
| 7,539,780 B2 | 5/2009 | Makhervaks et al. |
| 7,577,667 B2 | 8/2009 | Hinshaw et al. |
| 7,590,768 B2 | 9/2009 | Gormley |
| 7,710,968 B2 | 5/2010 | Cornett et al. |
| 8,037,154 B2 | 10/2011 | Biran et al. |
| 8,103,785 B2 | 1/2012 | Crowley et al. |
| 8,122,155 B1 | 2/2012 | Marti |
| 8,233,380 B2 | 7/2012 | Subramanian et al. |
| 8,265,095 B2 * | 9/2012 | Fritz ............... G06F 9/5011 710/59 |
| 8,832,216 B2 | 9/2014 | Bugge |
| 9,241,044 B2 * | 1/2016 | Shribman ............ H04L 67/06 |
| 9,462,308 B2 * | 10/2016 | LaBosco ......... H04N 21/43635 |
| 2014/0089444 A1 | 3/2014 | Makhervaks et al. |
| 2015/0026286 A1 | 1/2015 | Sharp et al. |

\* cited by examiner

SCALABLE DATA USING RDMA AND MMIO

CROSS-REFERENCE TO RELATED APPLICATIONS

This application claims the benefit of U.S. Provisional Application Ser. No. 62/030,700 filed Jul. 30, 2014, and U.S. Provisional Application Ser. No. 62/126,920 filed Mar. 2, 2015, the entire contents of which are incorporated herein by reference in their entirety.

BACKGROUND

1. Field

The disclosure generally relates to accessing remote storage devices and particularly to accessing remote storage devices over Remote Direct Memory Access (RDMA).

2. Description of the Related Art

Storage systems in general and block based storage systems are a key element in modern data centers. These systems are designed to retrieve and store large quantities of data. Effectiveness and usefulness of these systems are based upon several criteria and characteristics. The following are some of the characteristics:

(a) The bandwidth of data transfer or throughput, both for retrieve operations and for store operations. This is also often called transfer speed.

(b) The latency until data transfer commences, both for retrieve operations and store operations.

(c) The number of operations per second achievable in the system, both for retrieve operations and store operations.

(d) The system wide storage space, i.e., the amount of data the system can store.

(e) The size scalability of the system, which governs the ability of changing the size of the storage system during its life cycle. A scalable system is one which permits starting with a small system relative to its maximum size and altering its size with ease, as necessary, with limited penalty. Usually penalties are related to performance degradation or system downtime. Another aspect of this characteristic is linearity in scale vs. cost.

(f) The connectivity scalability of the system, which governs the ability of the system to retain its main characteristics whether accessed by a small number or a large number of clients.

There is an ongoing trend of improvement of storage systems with respect to all of these characteristics. This is a result of an ongoing market need and appreciation for such improvements.

The approaches described in this section are approaches that could be pursued, but not necessarily approaches that have been previously conceived or pursued. Similarly, the above-mentioned criteria and characteristics are not necessarily known to those skilled in the art. Therefore, unless otherwise indicated, it should not be assumed that any of the information described in this section qualify as prior art merely by virtue of their inclusion in this section. Similarly, issues identified with respect to one or more approaches should not assume to have been recognized in any prior art on the basis of this section, unless otherwise indicated.

SUMMARY

Exemplary embodiments overcome the above disadvantages and other disadvantages not described above. Also, an exemplary embodiment is not required to overcome the disadvantages described above, and an exemplary embodiment of the present inventive concept may not overcome any of the problems described above.

One or more exemplary embodiments provide a computerized method for retrieving data from a memory mapped input/output (MMIO) enabled storage device of a control server communicatively coupled with a client device through a remote direct memory access (RDMA) enabled network interface controller (rNIC). The method includes receiving from the client device, through a first communication protocol, a first entry for a submission queue, the first entry using a second communication protocol that permits communication between the control server and the MMIO enabled storage device; receiving from the client device, through the first communication protocol, a second entry for a send queue, the second entry using the first communication protocol to send a data block from a memory reserved for the client device to the client device; receiving a trigger for the first entry; and receiving, using the second communication protocol, the data block from the MMIO enabled storage device in response to executing the first entry; and transmitting, using the first communication protocol, the data block to the client device in response to the data block being received from the MMIO enabled storage device.

The first communication protocol may include one from among Infiniband, RDMA over Converged Ethernet (RoCE), and iWARP.

The second communication protocol may be NVMexpress.

The first entry may include an instruction set that when executed by the storage device causes the storage device to read a block of data into the memory reserved for the client device.

The second entry may include an instruction set that when executed causes the data block to be written to a memory in the client device.

The trigger may be a doorbell.

The method may further include executing the first entry for in response to writing to the doorbell.

The method may further include generating an interrupt by the storage device.

The method may further include receiving instructions, at the storage device, to generate the interrupt to invoke the trigger.

The method may further include sending the client device an instruction to generate an interrupt to indicate the first entry was executed.

The method may further include receiving from the client device a poll to determine if the first entry was executed.

The method may further include reading a fixed data block from the storage device into the trigger.

The method may further include receiving the interrupt by a processing element of the control server; and invoking the trigger in response to receiving the interrupt.

According to an aspect of an exemplary embodiment, there is provided a computerized method for storing data in a memory mapped input/output (MMIO) enabled storage device of a control server communicatively coupled with a client device through a remote direct memory access (RDMA) enabled network interface controller (rNIC). The method includes receiving through a first communication protocol from the client device a first data block for storing on the storage device; receiving through the first communication protocol from the client device a first entry for a submission queue, the first entry for communicating using a second communication protocol; receiving through the first communication protocol from the client device a second entry for a send queue to send a second data block from a memory reserved for the client device to the client device over the first communication protocol; and receiving a trigger in response to receiving the second entry, and sending the second data block to the client device using the first communication protocol.

The first communication protocol may include one from among Infiniband, RoCE, and iWARP.

The second communication protocol may include NVM-express.

The second entry for the submission queue may include an instruction set that when executed by the storage device causes the storage device to write the second data block from the memory reserved for the client device.

The method may further include generating an interrupt by the storage device.

The storage device may receive instructions to generate the interrupt to invoke the trigger.

The method may further include sending the client device an instruction to generate an interrupt to indicate the second entry was executed.

The method may further include receiving from the client device a poll to determine if the second entry was executed.

The method may further include reading a fixed data block from the storage device into the trigger.

The method may further include receiving the interrupt by a processing element of the control server; and invoking the trigger.

According to an aspect of an exemplary embodiment, there is provided a non-transitory computer readable medium having stored thereon instructions that when executed by one or more processing elements perform a method of retrieving data from a memory mapped input/output (MMIO) enabled storage device of a control server communicatively coupled with a client device through a remote direct memory access (RDMA) enabled network interface controller (rNIC). The method includes receiving from the client device, through a first communication protocol, a first entry for a submission queue, the first entry using a second communication protocol that permits communication between the control server and the MMIO enabled storage device; receiving from the client device, through the first communication protocol, a second entry for a send queue, the second entry using the first communication protocol to send a data block from a memory reserved for the client device to the client device; receiving a trigger for the first entry; and receiving, using the second communication protocol, the data block from the MMIO enabled storage device in response to executing the first entry; and transmitting, using the first communication protocol, the data block to the client device in response to the data block being received from the MMIO enabled storage device.

According to an aspect of an exemplary embodiment, there is provided a non-transitory computer readable medium having stored thereon instructions that when executed by one or more processing elements perform a method for storing data in a memory mapped input/output (MMIO) enabled storage device of a control server communicatively coupled with a client device through a remote direct memory access (RDMA) enabled network interface controller (rNIC). The method includes receiving through a first communication protocol from the client device a first data block for storing on the storage device; receiving through the first communication protocol from the client device a first entry for a submission queue, the first entry for communicating using a second communication protocol; receiving through the first communication protocol from the client device a second entry for a send queue to send a second data block from a memory reserved for the client device to the client device over the first communication protocol; and receiving a trigger in response to receiving the second entry, and sending the second data block to the client device using the first communication protocol.

According to an aspect of an exemplary embodiment, there is provided a server including a remote direct memory access (RDMA) enabled network interface controller (rNIC) configured to communicate with a client using a first communication protocol and to communicate with a storage device using a second communication protocol; and a memory configured to store a data block received from the storage device using the second communication protocol. The rNIC is further configured to transmit the data block stored in the memory to the client device using the first communication protocol.

The rNIC may include the memory.

According to an aspect of an exemplary embodiment, there is provided a server that includes a remote direct memory access (RDMA) enabled network interface controller (rNIC) configured to communicate with a client device using a first communication protocol and to communicate with a storage device using a second communication protocol, the storage device including a memory reserved for the client device; a memory configured to store a first data block that is for storing on the storage device, in response to the rNIC receiving the data block from the client device; a submission queue configured to store a first entry in response to receiving the first entry from the client device, the first entry facilitating communication between the rNIC and the storage device using the second communication protocol; a send queue configured to store a second entry in response to receiving the second entry from the client device, the second entry facilitating sending a second data block from the memory reserved for the client device to the client device over the first communication protocol; and a doorbell configured to send the second data block to the client device using the first communication protocol in response to being triggered.

Other features and aspects will be apparent from the following detailed description, the drawings, and the claims.

BRIEF DESCRIPTION OF THE DRAWINGS

The foregoing and other objects, features and advantages will become apparent and more readily appreciated from the following detailed description taken in conjunction with the accompanying drawings, in which.

DETAILED DESCRIPTION

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

To improve upon some of the characteristics of current storage systems in general and block data storage systems in particular, exemplary embodiments combine state-of-the art networking techniques with state-of-the-art data storage elements in a novel way. A networking remote direct memory access (RDMA) technique and a storage-oriented memory mapped input output (MMIO) technique are combined in a system in order to provide direct access from a remote storage client to a remote storage device with little to no central processing unit (CPU) intervention of a remote storage server. In some exemplary embodiments, this technique may reduce the required CPU intervention on the client side. These reductions of CPU intervention reduce latency while providing performance improvements, and/or providing more data transfer bandwidth and/or throughput and/or more operations per second compared to other systems with equivalent hardware.

Figure 1:
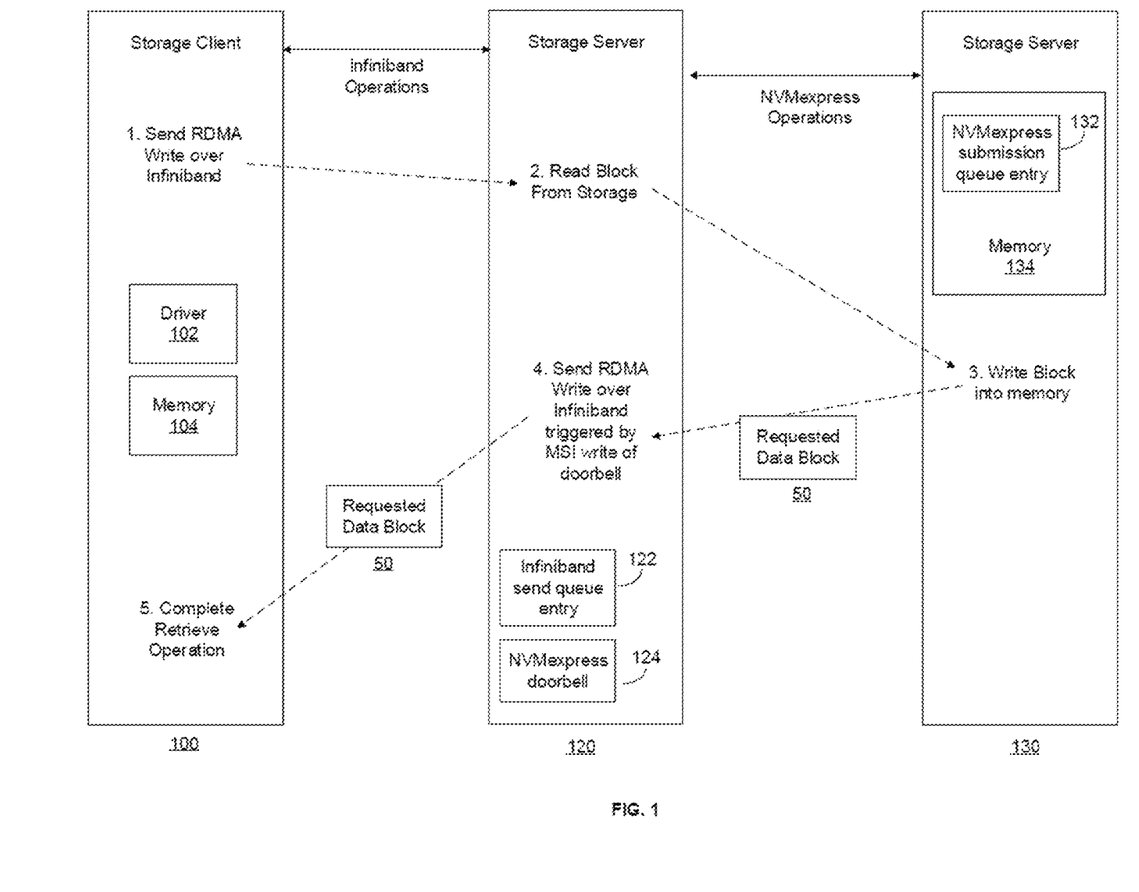
FIG. 1 is a schematic illustration of a storage client device retrieving data from a remote storage controlled by a storage server in accordance with an exemplary embodiment.

FIG. 1 is a non-limiting exemplary schematic illustration of a storage client device 100 retrieving data from a remote storage device 130. The remote storage device 130 is controlled by a storage server 120. The storage client 100 includes a driver software module 102 that generates a remote direct memory access (RDMA) write operation. The driver software module 102 is invoked by request to read a specific storage block into a memory 104 of the storage client device 100. In some embodiments, to perform storage retrieve operations, the driver software module 102 translates a logical address of the storage block into a physical address on the remote storage device 130, which is controlled by the storage server 120. The storage client device 100 uses the driver software module 102 to issue the RDMA-write operation. The RDMA-write operation writes an entry for a submission queue 132 dedicated to the storage client into a memory of the storage device 130. The entry for a submission queue 132 is an instruction to write a requested data block 50 from the storage device 130 into a send queue 122 on a memory of a Network Interface Card (NIC) (not shown) of the server 120. The NIC is typically and RDMA capable NIC (rNIC). The entry for the submission queue 132 includes another instruction instructing to write an interrupt into a doorbell 124 of the NIC that is dedicated to this storage client 100 and that triggers the data block 50 stored in the send queue 122 to be transmitted to the storage client 100.

The client 100 and the server 120 communicate using a first type of communication protocol. This first type of communication protocol may be Infiniband (IB). Infiniband is a communication protocol for high performance computing offering high throughput and low latency within a computer network. It should be understood that IB is presented here for pedagogical purposes, and it is clear that other communication protocols offering similar functionality, such as RDMA over Converged Ethernet (RoCE), and iWARP, may be used without departing from the scope of this disclosure.

The storage server 120 and the storage device 130 communicate using a second type of communication protocol. This second type of communication protocol may be NVMexpress. NVMexpress is a communication protocol for accessing solid-state drives attached through a PCI Express bus. NVMexpress is presented here for pedagogical purposes, and it is clear that other communication protocols offering similar functionality may be used without departing from the scope of this disclosure. The entry for the submission queue 132 may contain an instruction that causes the storage device 130 to write an instruction that causes the storage device 130 to read a requested data block 50 from a memory 134 of the storage device 130 that is reserved for the storage client 100. The data block 50 is at the translated physical address of the memory 134, which corresponds to the logical address of the specific storage block of the storage client device 100. The entry for the send queue 122 contains a request for an RDMA-write, which when executed writes the requested data block 50 to an area of the client memory 104 that is specified by the driver software module 2. Upon completion of the RDMA-write into the doorbell for the submission queue 124, an input/output (I/O) operation defined the by submission queue entry is triggered on the storage server 120.

Once the I/O operation is executed and completed, the memory area on the storage server 120 (i.e., the memory on the NIC of the storage server 120) contains the requested data block 50. In some embodiments, in conformance with the NVMexpress specification, the completion of the I/O operation triggers a message signaled interrupt (MSI), such as MSI-X function. An MSI-X function writes some payload or data into a memory address. In typical usage of MSI-X in general and for NVMexpress in particular, the MSI-X function is programmed to generate an interrupt, by having it write into the address of the local advanced programmable interrupt controller (APIC) of a processing element of the storage server, such as a central processing unit (CPU) with the payload or data being an interrupt vector number. In an embodiment, the MSI-X function is used in an atypical way by instructing a write of the interrupt into a doorbell of the send queue 124. The data written by the MSI function will trigger send queue activity, as it rings the doorbell of the send queue 124. Upon writing the MSI payload to the doorbell of the send queue 124, an RDMA-write over the network (e.g., IB network) is performed in order to transmit the requested data block 50 from the memory of the NIC to the memory area 104 on the client 100 where the driver software module 102 has instructed to place the data 50. Upon completion of the RDMA-write from the storage server 120 to the storage client 100, an interrupt may be triggered on the storage client 100, allowing the driver 102 to complete the operation.

In an alternative embodiment, the driver 102 may poll for completion.

In another embodiment, the doorbell of the send queue 124 on the storage server 120 is filled by reading a fixed block of data from the storage device 130 into the doorbell 124. This embodiment may be slower in general, but is potentially useful for cases where there are more clients than available MSI-X interrupts, typically over 2,048 (two thousand and forty eight).

In yet another embodiment the MSI-X interrupt is received by the APIC. The CPU fills the doorbell 124 upon reception of the interrupt.

Figure 2:
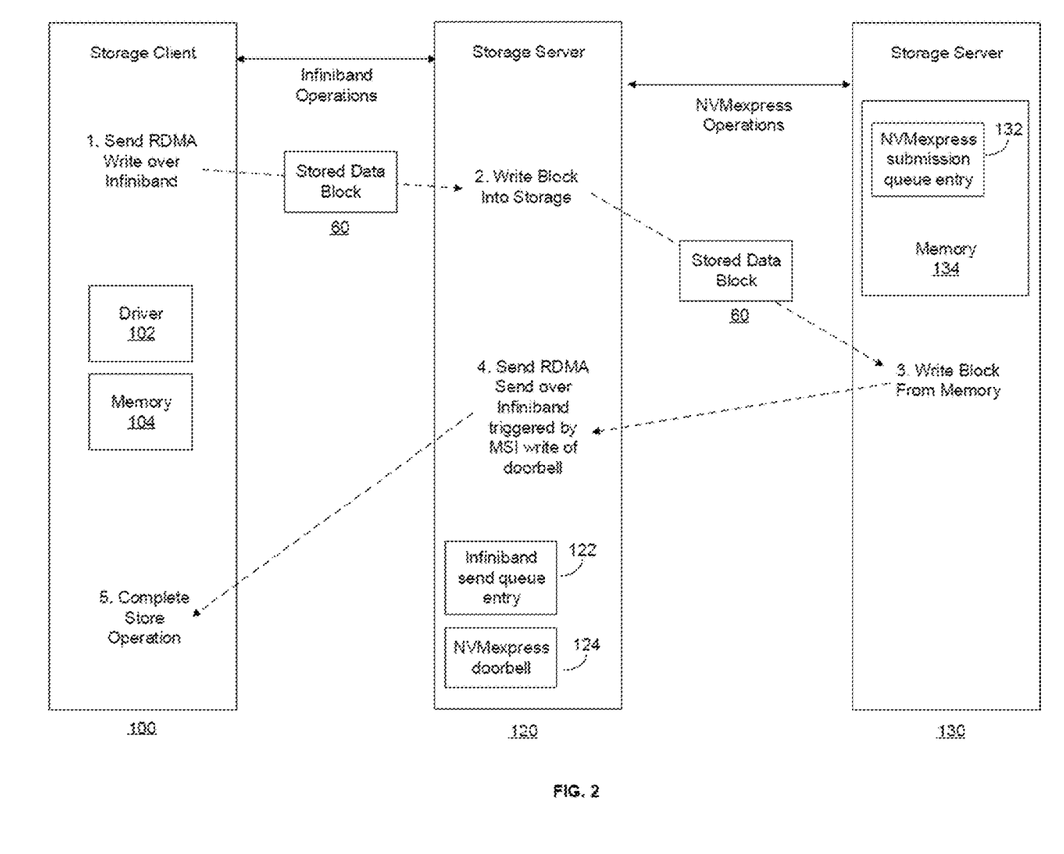
FIG. 2 is a schematic illustration of a storage client device writing data to a remote storage controlled by a storage server in accordance with an exemplary embodiment.

FIG. 2 is a non-limiting exemplary schematic illustration of a storage client device 100 writing data to a remote storage 130 controlled by a storage server 120 in accordance with an embodiment. A driver software module 102 executed on the storage client device 100 is invoked with a write request for a specific storage block from a memory 104 of the client device 100. The driver software module 102 translates the logical address of the specific storage block into a physical address on the remote storage device 130 of the remote storage server 120. The driver software module 102 issues an RDMA-write operation. The RDMA-write operation writes a data block 60 to be stored into the storage device 130 from a memory mapped address bus of the storage server 120.

The RDMA-write operation also writes an entry for a submission queue 132 dedicated to this storage client 100 into a memory 134 of the storage device 130. The entry for a submission queue 132 is an instruction to write the requested data block 60 into the storage device 130 and an instruction instructing to write an interrupt into a doorbell 124 that is dedicated to this storage client 100. The RDMA write also writes an entry for a send queue 122 for communicating from the storage server 120 to the storage client device 100.

The entry for the submission queue 132 contains instructions that when executed by the storage device 130 cause the storage device 130 to generate a 'write' to the storage device 130 of the stored data block 60 at the translated area from a memory area reserved for this storage client 100. The entry for the send queue 122 may contain a request for a dummy message from the storage client device 100 to the server 120 that is used for communicating the completion of the store operation from the server 120 to the client 100. Upon completion of the RDMA-write into the doorbell for the submission queue 124, an I/O operation is triggered on the storage server 120. The I/O operation is defined by the entry written to the submission queue 132. Upon completion of the I/O operation on the storage device 130, the data block from the memory mapped I/O area on the server has been written to the appropriate storage device at the appropriate address. In one embodiment, in conformance with the specification, the completion of the I/O operation triggers an MSI-X function. An MSI-X function writes some payload or data into a memory address. In typical usage of MSI-X in general and for NVMexpress in particular, the MSI-X function is programmed to generate an interrupt, by having it write into the address of the local APIC of a CPU with the payload or data being the interrupt vector number. In an embodiment, the MSI-X function is used in an atypical way by writing into the doorbell of the send queue 124. The data written triggers send queue activity. In some embodiments, upon the write to the doorbell of the send queue, which is the MSI payload, an Infiniband 'send' is performed over the network (e.g., IB network) transmitting the completion of the store operation to the storage client. In some embodiments, upon the completion of the Infiniband 'send' from the storage server 120 to the storage client device 100, an interrupt is triggered on the storage client 100 so the driver 102 can complete the operation. In an alternative embodiment, the driver software module 102 polls for completion of the operation. In another embodiment, the doorbell of the send queue 124 on the storage server 130 is filled by reading a fixed block of data from the storage device into the doorbell 124. This embodiment may be slower in general, but is potentially useful for cases where there are more clients than available MSI-X interrupts, typically 11248. In yet another embodiment the MSI-X interrupt received by the APIC. The CPU fills the doorbell 124 upon reception of the interrupt.

Figure 3:
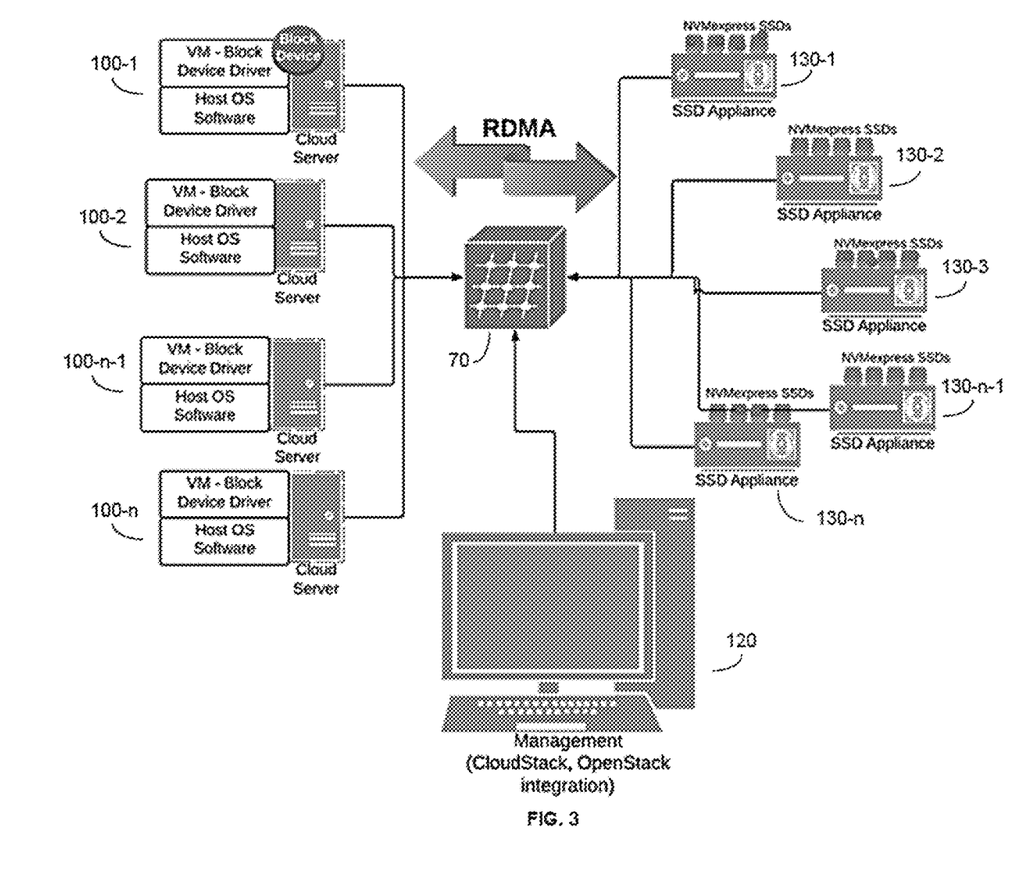
FIG. 3 is a schematic illustration of a Remote Direct Memory Access (RDMA) network with a plurality of client devices accessing a plurality of storage devices through a storage server, in accordance with an exemplary embodiment.

FIG. 3 is an exemplary non-limiting schematic illustration of an RDMA network 70 with a plurality of client devices 100-1 to 100-*n* accessing a plurality of storage devices 130-1 to 130-*n* through a storage server 120, in accordance with an exemplary embodiment. The RDMA network 70 is configured to provide connectivity of various sorts, as may be necessary, including but not limited to, wired and/or wireless connectivity, including, for example, local area network (LAN), wide area network (WAN), metro area network (MAN), worldwide web (WWW), Internet, and any combination thereof, as well as cellular connectivity. In an embodiment, the storage devices 130 are solid state drive (SSD) appliances. In another embodiment, storage clients 100 are cloud servers. In some embodiments, the switched network 70 is an RDMA-enabled Infiniband network. In such embodiments, storage server 120 and storage clients 100 have RDMA-enabled Infiniband network interfaces such remote direct memory access (RDMA) enabled network interface controller (rNIC).

In some exemplary embodiments, there are multiple storage servers that contain multiple storage devices. In some embodiments the, storage devices conform to the NVMexpress specification. A storage device may be a block data storage.

In some embodiments, storage clients may run on virtual machines, and in some embodiments the storage clients may run on physical machines. If the storage client devices run on a virtual machine, in some embodiments the underlying physical machine optionally support the single root I/O virtualization (SR-IOV) specification enabling generation of Infiniband RDMA operations from the virtual machine without hypervisor invocation.

In some embodiments, a driver software module 102 provides the functionality required for the storage system to appear as a blocked data storage element. The driver 102 and the storage server communicate with a management software module for the purpose of defining the partitioning of the blocked data storage for multiple clients.

Using the methods detailed herein, storage replication is possible for high availability purposes across storage servers and storage devices. A storage client device 100 may issue a plurality of store and a corresponding plurality of retrieve operations as may be necessary. A first storage server may be the storage client device for a second storage server, in some embodiments.

In an embodiment, a plurality of physical storage devices from a plurality of storage servers include a single logical storage device from the storage client device perspective. In another embodiment, the entire storage area including the aggregation of storage area from a plurality of storage devices on a plurality of storage servers can be divided into a plurality of logical storage devices from the storage client device perspective. In some embodiments, the division of part or all of the entire storage area need not be related to the actual physical devices. In some embodiments, there can be a performance benefit in a division of part of or of the entire storage area that is orthogonal to the actual layout, one which aggregates data from multiple physical devices to implement one or more logical storage devices from the client device perspective. In an embodiment, there is a software module for managing the division of the aggregate storage area into partitions. This software module may use a database to store the partitioning definition. The database may store the partitioning definition in the storage area, in a dedicated management partition. The partitioning of the storage area can be changed online without stopping or rebooting the system. Each storage client may view its own segment or partition of the aggregate storage area. Alternatively, a plurality of clients may perform retrieve or store operations on shared or overlapping segments or partitions of the storage area.

In an embodiment, the number of storage servers and the number of storage devices connected to them or embedded within are constant and the number of storage servers and the number of storage devices cannot be changed during the life cycle of the system, although they may be replaced.

In another embodiment, additional storage servers may be added to the system. Likewise, additional storage devices can be added to storage servers. In an embodiment of the system additional storage, additional storage servers, additional storage devices, or both may optionally be added to storage available to one or more clients.

In one embodiment, one or more of the following additional functionalities may optionally be layered on top of the storage system and/or as methods run on a client device accessing the storage system.

(a) A file system is run on the storage device or one or more of its partitions.

(b) A distributed file system is run on the storage device or one or more of its partitions.

(c) A duplication method is implemented to support failure scenarios where one or more storage elements and/or storage servers fails. Well known methods such as data duplication and error code correction may be employed.

(d) A deduplication method may be implemented to conserve storage area by maintaining fewer copies, perhaps even just one, of data that without this method would have been stored in multiple copies in the storage area.

(e) Security mechanisms that enable using the storage system for different entities with different permissions.

In an embodiment, duplication is optionally embedded into the system to improve the quality of the duplication and to increase improved system availability, i.e. its ability to withstand failures while providing data storage service. Embedding the duplication method into the system may also increase overall performance as combinations of RDMA and MMIO may then be used for this purpose also, as the duplication will occur immediately and require less computation resources on the storage client.

In an embodiment, deduplication is embedded into the system to improve the quality of the deduplication and the reduction in storage area used. Embedding the deduplication method into the system may also increase overall performance as combinations of RDMA and MMIO may then be used for this purpose also.

In an embodiment, some security aspects are embedded into the system to improve the efficiency of the security mechanisms. In an embodiment of the invention, NVMexpress namespaces are used for this purpose, which reduces the required computational resources used to implement the security mechanisms.

The principles herein are implemented as hardware, firmware, software or any combination thereof. Moreover, the software is preferably implemented as an application program tangibly embodied on a program storage unit or computer readable medium. The application program may be uploaded to, and executed by, a machine including any suitable architecture. Preferably, the machine is implemented on a computer platform having hardware such as a processing unit ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit and/or display unit.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. The specification mentions certain implementations of technologies, such as NVMexpress, Infiniband, and MSI-X. The technology names are provided in an exemplary manner and should be construed as such. All trademarks, service marks, trade names, and product names are the property of their respective owners.

What is claimed is:

1. A computerized method for retrieving data from a memory mapped input/output (MMIO) enabled storage device of a control server communicatively coupled with a client device through a remote direct memory access (RDMA) enabled network interface controller (rNIC), the method comprising:

receiving from the client device, through a first communication protocol, a first entry for a submission queue, the first entry using a second communication protocol that permits communication between the control server and the MMIO enabled storage device;

receiving from the client device, through the first communication protocol, a second entry for a send queue, the second entry using the first communication protocol to send a data block from a memory reserved for the client device to the client device;

receiving a trigger for the first entry, the trigger being a doorbell; and receiving, using the second communication protocol, the data block from the MMIO enabled storage device in response to executing the first entry; and transmitting, using the first communication protocol, the data block to the client device in response to the data block being received from the MMIO enabled storage device.

2. The computerized method of claim 1, wherein the first communication protocol includes one from among Infiniband, RDMA over Converged Ethernet (RoCE), and iWARP.

3. The computerized method of claim 1, wherein the second communication protocol is NVMexpress.

4. The computerized method of claim 1, wherein the first entry comprises an instruction set that when executed by the storage device causes the storage device to read a block of data into the memory reserved for the client device.

5. The computerized method of claim 1, wherein the second entry comprises an instruction set that when executed causes the data block to be written to a memory in the client device.

6. The computerized method of claim 1, further comprising executing the first entry for in response to writing to the doorbell.

7. The computerized method of claim 1, further comprising generating an interrupt by the storage device.

8. The computerized method of claim 7, further comprising receiving instructions, at the storage device, to generate the interrupt to invoke the trigger.

9. The computerized method of claim 1, further comprising sending the client device an instruction to generate an interrupt to indicate the first entry was executed.

10. The computerized method of claim 1, further comprising receiving from the client device a poll to determine if the first entry was executed.

11. The computerized method of claim 1, further comprising reading a fixed data block from the storage device into the trigger.

12. The computerized method of claim 7, further comprising:
receiving the interrupt by a processing element of the control server; and
invoking the trigger in response to receiving the interrupt.

13. A computerized method for storing data in a memory mapped input/output (MMIO) enabled storage device of a control server communicatively coupled with a client device through a remote direct memory access (RDMA) enabled network interface controller (rNIC), the method comprising:
receiving through a first communication protocol from the client device a first data block for storing on the storage device;
receiving through the first communication protocol from the client device a first entry for a submission queue, the first entry for communicating using a second communication protocol;
receiving through the first communication protocol from the client device a second entry for a send queue to send a second data block from a memory reserved for the client device to the client device over the first communication protocol; and
receiving a trigger in response to receiving the second entry, and sending the second data block to the client device using the first communication protocol, the trigger being a doorbell.

14. The computerized method of claim 13, wherein the first communication protocol includes one from among Infiniband, RoCE, and iWARP.

15. The computerized method of claim 13, wherein the second communication protocol is NVMexpress.

16. The computerized method of claim 13, wherein the second entry for the submission queue comprises an instruction set that when executed by the storage device causes the storage device to write the second data block from the memory reserved for the client device.

17. The computerized method of claim 13, further comprising generating an interrupt by the storage device.

18. The computerized method of claim 17, wherein the storage device receives instructions to generate the interrupt to invoke the trigger.

19. The computerized method of claim 13, further comprising sending the client device an instruction to generate an interrupt to indicate the second entry was executed.

20. The computerized method of claim 13, further comprising receiving from the client device a poll to determine if the second entry was executed.

21. The computerized method of claim 13, further comprising reading a fixed data block from the storage device into the trigger.

22. The computerized method of claim 17, further comprising:
receiving the interrupt by a processing element of the control server; and
invoking the trigger.

23. A non-transitory computer readable medium having stored thereon instructions that when executed by one or more processing elements perform a method of retrieving data from a memory mapped input/output (MMIO) enabled storage device of a control server communicatively coupled with a client device through a remote direct memory access (RDMA) enabled network interface controller (rNIC), the method comprising:
receiving from the client device, through a first communication protocol, a first entry for a submission queue, the first entry using a second communication protocol that permits communication between the control server and the MMIO enabled storage device;
receiving from the client device, through the first communication protocol, a second entry for a send queue, the second entry using the first communication protocol to send a data block from a memory reserved for the client device to the client device;
receiving a trigger for the first entry, the trigger being a doorbell; and
receiving, using the second communication protocol, the data block from the MMIO enabled storage device in response to executing the first entry; and
transmitting, using the first communication protocol, the data block to the client device in response to the data block being received from the MMIO enabled storage device.

24. A non-transitory computer readable medium having stored thereon instructions that when executed by one or more processing elements perform a method for storing data in a memory mapped input/output (MMIO) enabled storage device of a control server communicatively coupled with a client device through a remote direct memory access (RDMA) enabled network interface controller (rNIC), the method comprising:
receiving through a first communication protocol from the client device a first data block for storing on the storage device;
receiving through the first communication protocol from the client device a first entry for a submission queue, the first entry for communicating using a second communication protocol;
receiving through the first communication protocol from the client device a second entry for a send queue to send a second data block from a memory reserved for the client device to the client device over the first communication protocol; and
receiving a trigger in response to receiving the second entry, and sending the second data block to the client device using the first communication protocol, the trigger being a doorbell.

25. A server including:
a remote direct memory access (RDMA) enabled network interface controller (rNIC) configured to communicate with a client device using a first communication protocol and to communicate with a storage device using a second communication protocol, the storage device including a memory reserved for the client device;
a memory configured to store a first data block that is for storing on the storage device, in response to the rNIC receiving the data block from the client device;
a submission queue configured to store a first entry in response to receiving the first entry from the client device, the first entry facilitating communication between the rNIC and the storage device using the second communication protocol;
a send queue configured to store a second entry in response to receiving the second entry from the client device, the second entry facilitating sending a second data block from the memory reserved for the client device to the client device over the first communication protocol; and
a doorbell configured to send the second data block to the client device using the first communication protocol in response to being triggered.

* * * * *